(12) United States Patent
Jiang-Häfner

(10) Patent No.: US 8,305,778 B2
(45) Date of Patent: Nov. 6, 2012

(54) METHOD AND SYSTEM TO INFLUENCE THE POWER GENERATION OF AN ADJUSTABLE SPEED GENERATOR

(75) Inventor: Ying Jiang-Häfner, Ludvika (SE)

(73) Assignee: ABB Technology AG, Västerås (SE)

( * ) Notice: Subject to any disclaimer, the term of this patent is extended or adjusted under 35 U.S.C. 154(b) by 599 days.

(21) Appl. No.: 12/597,851

(22) PCT Filed: Apr. 27, 2007

(86) PCT No.: PCT/EP2007/054196
§ 371 (c)(1),
(2), (4) Date: Oct. 27, 2009

(87) PCT Pub. No.: WO2008/131799
PCT Pub. Date: Nov. 6, 2008

(65) Prior Publication Data
US 2010/0085783 A1    Apr. 8, 2010

(51) Int. Cl.
*H02J 3/36* (2006.01)
*F03D 9/00* (2006.01)
*H02P 9/04* (2006.01)

(52) U.S. Cl. .......................... 363/35; 290/44

(58) Field of Classification Search .............. 363/35; 290/44; 323/207
See application file for complete search history.

(56) References Cited

U.S. PATENT DOCUMENTS

| | | | |
|---|---|---|---|
| 5,365,153 A * | 11/1994 | Fujita et al. | 318/34 |
| 5,666,275 A * | 9/1997 | Inokuchi et al. | 363/35 |
| 6,411,067 B1 * | 6/2002 | Bjorklund | 323/207 |
| 6,856,040 B2 * | 2/2005 | Feddersen et al. | 290/44 |
| 7,012,409 B2 * | 3/2006 | Schreiber et al. | 323/207 |
| 7,117,070 B2 * | 10/2006 | Chow et al. | 323/207 |
| 7,239,535 B2 * | 7/2007 | Siljestrom et al. | 363/41 |
| 2003/0007369 A1 * | 1/2003 | Gilbreth et al. | 363/35 |

OTHER PUBLICATIONS

Ming Yin et al.; "Analysis and Control of Wind Farm Incorporated VSC-HVDC in Unbalanced Condtions'" 2005 IEEE; pp. 1-6.
Lianxiang Tang et al.; Protection of VSC-Multi-Terminal HVDC against DC Faults; 2002 IEEE; pp. 719-724.
Gengyin Li et al.; Modeling of VSC-HVDC and Control Strategies for Supplying both Active and Passive Systems:; 2006 IEEE; pp. 1-6.
Song Ruihua et al.; "VSCs based HVDC and its control strategy"; 2005 IEEE; pp. 1-6.

(Continued)

*Primary Examiner* — Jue Zhang
(74) *Attorney, Agent, or Firm* — Venable LLP; Eric J. Franklin

(57) ABSTRACT

A method and a system to influence the power generation of at least one adjustable speed generator. The system includes a first voltage source converter connected to a local AC bus. The local AC bus is provided with power by the at least one adjustable speed generator. A second voltage source converter connected to an AC grid. A DC link is connected between the first and the second voltage source converter. At least one control unit controls the first and the second voltage source converters. The at least one control unit performs the method to control the AC voltage in the local AC bus via the first voltage source converter and to modify a reference value for the AC voltage magnitude of the local AC bus in dependence on the AC voltage magnitude of the AC grid.

8 Claims, 3 Drawing Sheets

OTHER PUBLICATIONS

R.C. Bansal et al.; "Some Issues Related to Power Generation Using Wind Energy Conversion Systems: An Overview", International Journal of Emerging Electric Power Systems; vol. 3, Issue 2, Article 1070; 2005; pp. 1-17.

Anders Lindberg; PWM and Control of Two and Three Level High Power Voltage Source Converters; Royal Institute of Technology, 1995.

PCT/ISA/210—International Search Report—Jan. 30, 2008.

PCT/ISA/237—Written Opinion of the Internatinal Searching Authority—Jan. 30, 2008.

PCT/IPEA/409—International Preliminary Report on Patentability—Jul. 30, 2009.

* cited by examiner

METHOD AND SYSTEM TO INFLUENCE THE POWER GENERATION OF AN ADJUSTABLE SPEED GENERATOR

CROSS-REFERENCE TO RELATED APPLICATIONS

This application is the national phase under 35 U.S.C. §371 of PCT/EP2007/054196 filed 27 Apr. 2007

FIELD OF THE INVENTION

The invention relates to a method to influence the power generation of an adjustable speed generator and to a related system, where the system comprises a first voltage source converter connected to a local AC bus, the local AC bus being provided with power by the at least one adjustable speed generator, a second voltage source converter connected to an AC grid, a DC link connected between the first and the second voltage source converter and at least one control unit to control the first and the second voltage source converters.

BACKGROUND OF THE INVENTION

Direct current (DC) power transmission systems are used today to interconnect alternating current (AC) power systems and to transmit power at high voltages over long distances. These systems are known in the art as High Voltage Direct Current (HVDC) transmission systems. The main parts of a HVDC system are the DC link in form of one or a multiple of power cables or overhead lines and a converter station at each end of the DC link containing a power converter. The power converter which transforms AC into DC is called rectifier, and the power converter transforming DC into AC is called inverter. The rectifier transfers active power from the AC side to the DC side and the inverter transfers active power from the DC side to the AC side. Hence, the power in the DC link flows from the rectifier to the inverter.

The HVDC converters which are subject of the present invention are voltage source converters (VSC). The functional principle of such a converter type is widely known in the art, see for example Anders Lindberg, "PWM and Control of Two and Three Level High Power Voltage Source Converters", KTH Stockholm 1995, ISSN-1100-1615, in particular pages 1, 77-104 and appendix A.

A HVDC system can for example be used to link two independent AC power grids so that power can be transferred from one grid to the other at varying rates according to power trade purposes. A HVDC system may also be used to connect a power generation plant to an AC grid, where the power generation plant provides power and voltage with varying quality and stability and where the possibility to control the VSCs of the HVDC system is used to compensate for these variations in order to fulfil the requirements of power infeed into an AC grid. An example for such an application is the connection of a wind park or wind farm to an AC grid, where the wind farm could be an offshore-installation. Nowadays, large wind farms can be found which comprise wind mills with more than 2.0 Megawatt output power. In wind mills of that size it is common practice to use so called adjustable speed generators (ASG) to transform the wind energy into electrical power. ASGs are cost effective and provide a simple pitch control of the propeller at reduced mechanical stress. The ASGs available on the market comprise either a synchronous generator and two full-sized converters which connect the stator of the synchronous generator to the AC line or AC bus of the wind farm or a doubly-fed induction generator, where the rotor is coupled via two back-to-back connected VSCs and the stator is connected directly to the AC line or AC bus of the wind farm. The AC line or AC bus of the wind farm is called local AC bus in the following. As already described, the local AC bus is itself connected via a HVDC system to an AC power grid.

ASGs have the advantage that due to the control of the VSCs the wind mill delivers power at constant frequency to the local AC bus. This implies at the same time that the power generation by the synchronous or induction generator in the ASG is working independently of frequency or phase angle variations of the AC voltage in the local AC bus. Opposed to that, a synchronous or induction generator connected directly to an AC line would react to a sudden increase of the frequency of the AC voltage with a reduction in the generated power. However, this is not the case for an ASG.

One or a multiple of ASGs connected via a HVDC system with VSCs to an AC grid may encounter the following problem. If an AC fault occurs in the AC grid so that only a reduced or zero power can be fed into the grid, the DC voltage in the DC link will increase due to the fact that the VSC connected to the wind farm keeps delivering the defined constant power from the AC to the DC side. The increase of the DC voltage will happen very quickly since the capacitance of the DC link has a comparatively small time constant.

To overcome this problem it is known in the art to use a DC chopper, which is composed of at least one switchable resistor. In case of a fault in the AC grid which leads to a reduced power infeed into the grid, the at least one resistor is switched to be connected in parallel to the DC link, so that overpower delivered by the wind farm is absorbed in the resistor. The power rating for the chopper resistor or resistors needs to be extraordinarily high, since power of up to a few hundreds of MW is transmitted from wind farms over HVDC links in today's applications. Apart from that it is common to use an IGBT as switch in order to achieve fast control. The known DC chopper installations require considerable space and are costly. In addition, the DC chopper control function causes disturbances in the usual HVDC control which make it difficult to achieve a smooth and stable recovery of the system after the fault in the AC grid is cleared. A power regulation by control of the VSC in the HVDC system which is connected between the wind farm and the DC link, where this VSC is referred to as first voltage source converter in the following, is regarded in the art as non-effective since the power generation of ASGs can not be affected by AC frequency variations, as explained above.

SUMMARY OF THE INVENTION

It is an object of the present invention to provide a method and a system of the kind described above which allow fast influencing of the power generation of the at least one ASG. It is another object of the invention that the system needs lesser space and is less costly than the DC chopper.

The object is achieved by a method and a system.

The invention is based on the recognition of the fact that a basic feature of the control of the VSCs in the ASG is the limitation of the current of the VSCs to a maximum. The VSCs in the ASG are controlled to adjust the speed of the generator and/or to adjust the active and reactive power generation of the ASG. Both, speed and power are basically adjusted via controlling of current. Since the maximum current is limited, the maximum power generated by the ASG depends on the magnitude of the AC voltage on the output side of the ASG. Accordingly the invention is based on the idea to modify the power generated by the ASG by modifying the AC voltage in the local AC bus. This modification is done by control of the first voltage source converter.

The method according to the invention comprises the steps of controlling via the first voltage source converter the AC voltage in the local AC bus and modifying a reference value for the AC voltage magnitude of the local AC bus in dependence on the AC voltage magnitude of the AC grid.

In the system according to the invention, the method steps are performed by the at least one control unit.

By adjusting the AC voltage in the local AC bus it is possible to provoke an adjustment of the power generated by the at least one ASG. Accordingly, it is no longer necessary to arrange for a DC chopper in the DC link in order to absorb any overpower. Instead an immediate reaction of the power generation of the ASG to changes in the power flow to the AC grid is achieved by controlling the first voltage source converter accordingly. The omittance of the DC chopper leads to a smaller and less costly system.

In an embodiment of the inventive method, a fault in the AC grid is detected, the first voltage source converter is set to control the AC voltage in the local AC bus and the reference value for the AC voltage magnitude is reduced with decreasing AC voltage magnitude of the AC grid. With this method a fast and effective reaction to a fault in the AC grid is achieved, whereby the reduction of the reference value of the AC voltage in the local AC bus leads to a response of the first voltage source converter to reduce the AC voltage magnitude in the local AC bus. This again leads to a reduction in the power generated by the at least one ASG. As a result, overvoltages in the DC link caused by a fault in the AC grid can be prevented. Since no DC chopper is needed, the disturbances of the usual HVDC control can be avoided which results in the possibility for a smooth and stable recovery of the HVDC system after clearance of the fault.

After clearance of the fault it is suggested according to an extension of the embodiment to increase the reference value for the AC voltage magnitude with increasing AC voltage magnitude of the AC grid. Thereby, the power generation of the at least one ASG can be increased in correlation with the recovery of the AC grid in a smooth and continuous manner.

In a further embodiment, a fault in the AC grid is detected by monitoring the rate of an increase in the DC voltage. If the voltage in the DC link exceeds a predetermined rate level, a fault is indicated. This approach is for example advantageous if no direct measurement information from the AC grid is available or if this information is received delayed. The fast increase of the DC voltage is a very reliable indicator of a problem with the power infeed into the AC grid and in any case the reaction should be a decrease in the power generation of the at least one ASG.

Additionally to the rate of the DC voltage, the absolute magnitude level of the DC voltage can be monitored. If the DC voltage rate as well as the DC voltage magnitude each exceeds a predetermined value, a fault in the AC grid is indicated. By monitoring the DC voltage magnitude it is ensured, that the power of the at least one ASG is only adjusted in cases where considerable overpower is detected. Variations in the DC voltage with minor amplitudes are ignored, even if they occur with considerable rate of change, thereby keeping the HVDC system under stable operating conditions as long as possible.

In a special embodiment of the system, the system comprises a first control unit to control the first voltage source converter and a second control unit to control the second voltage source converter, instead of controlling both voltage source converters via one control unit. According to this embodiment, the second control unit sends the AC voltage magnitude of the AC grid via telecommunication to the first control unit. Since telecommunication usually causes a delay in providing information, the fault detecting method based on the monitoring of the DC voltage rate of change and magnitude could be applied in order to increase the chances to detect a fault in the AC grid even before the voltage information from the AC grid reaches the first control unit.

BRIEF DESCRIPTION OF THE DRAWINGS

The invention is now described by way of example with reference to the accompanying drawings in which.

DETAILED DESCRIPTION OF EMBODIMENTS OF THE INVENTION

Figure 1:
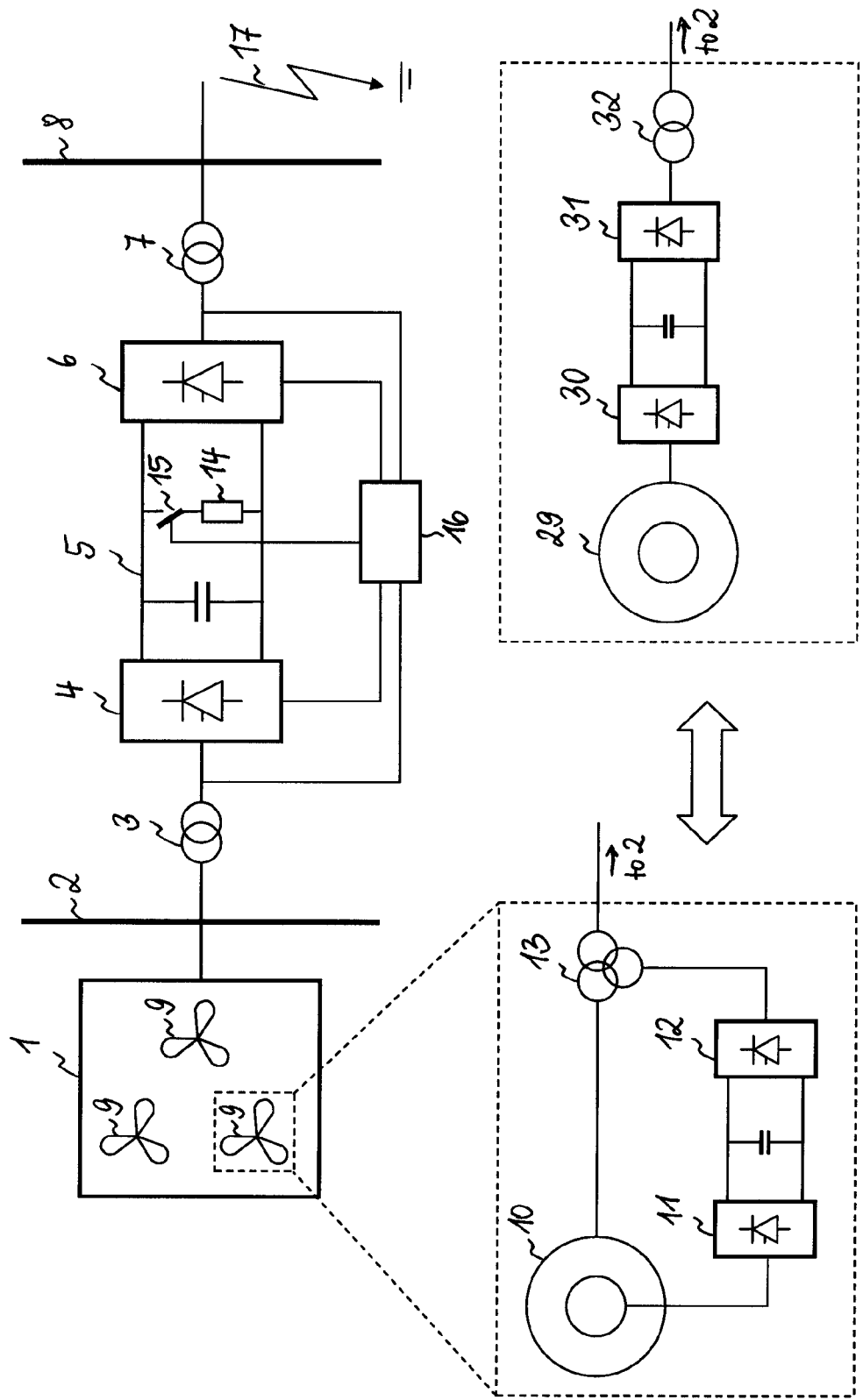
FIG. 1 shows a schematic diagram of a wind farm with several ASGs, where the wind farm is connected as known in the art to an AC grid via a HVDC system.

FIG. 1 shows a schematic diagram of a wind farm 1 and its connection to an AC grid 8, as it is known in the art. The wind farm 1 is coupled to a local AC bus, the local AC bus 2 being connected via a first transformer 3 and/or a reactor (not shown) to a first voltage source converter (VSC) 4. The first VSC 4 is connected via a DC link 5 to a second VSC 6 and the second VSC 6 is connected via a second transformer 7 to an AC grid 8. The wind farm 1 comprises several adjustable speed generators (ASG) 9 which are composed of either a doubly-fed induction generator 10 and two back-to-back connected VSCs 11 and 12 or a synchronous generator 29 with two full-sized converters 30 and 31. The two VSCs 11 and 12 are connected on one side to the rotor of the induction generator 10 and on the other side, via a transformer 13, to the local AC bus 2. The two VSCs 30 and 31 connect the stator of the synchronous generator 29 via a transformer 32 to the local AC bus 2.

Since the ASGs 9 of the wind farm 1 do not react to variations in frequency of the AC voltage of local AC bus 2, a DC chopper consisting of a resistor 14 and an IGBT switch 15 is arranged in the DC link 5. A control unit performs the control of the first VSC 4 and the second VSC 6 in order to ensure the fulfilment of power quality and voltage stability criteria with respect to the power infeed into AC grid 8. Apart from that, the control unit 16 monitors the AC voltage of AC grid 8 in order to detect a possible fault 17 in the AC grid 8. If a fault 17 is detected which leads to an increase in the power in DC link 5, the control unit 16 closes IGBT switch 15 in order to absorb the overpower in resistor 14 before an overvoltage in the DC link 5 occurs.

Figure 2:
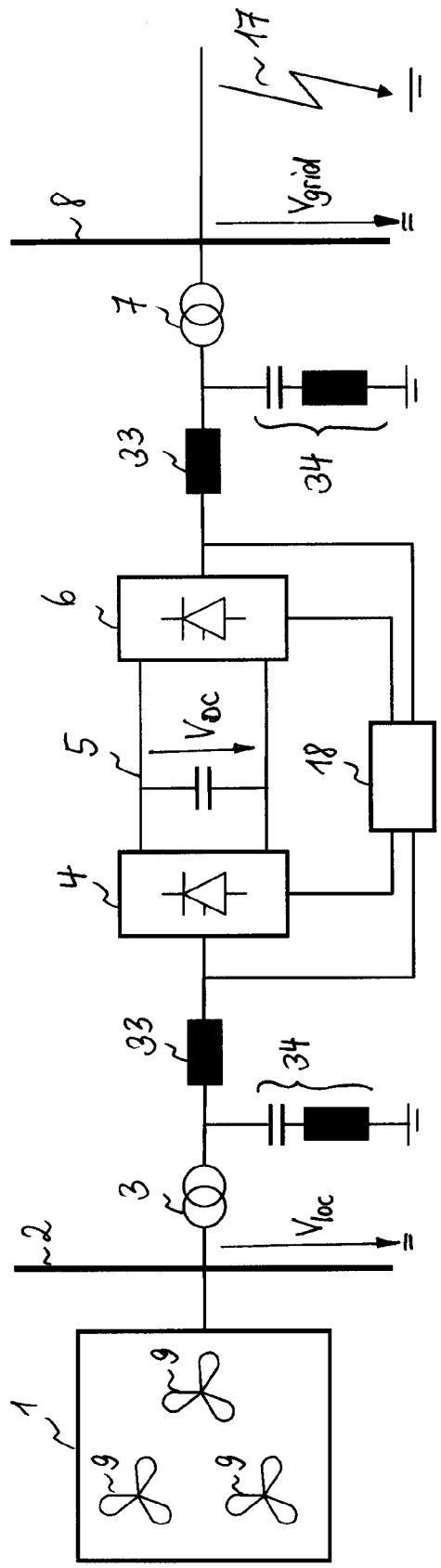
FIG. 2 shows the arrangement of FIG. 1 with a system according to the invention.

According to the invention, the DC chopper is omitted which results in an arrangement according to FIG. 2, where the same elements as in FIG. 1 are referenced with the same numbers. Additionally, an AC reactor 33 and an AC filter 34 are included between the first and second transformers 3 and 7 and the first and second VSC 4 and 6, respectively. These elements and their functionality are known in the art. In the arrangement of FIG. 2 a control unit 18 is provided which under normal working conditions controls the first VSC 4 and the second VSC 6 in the same way as the known control unit 16, but which additionally is able to provoke a change in the power generation of the ASGs 9 of wind farm 1 by modifying the AC voltage $V_{loc}$ in the local AC bus 2.

Figure 3:
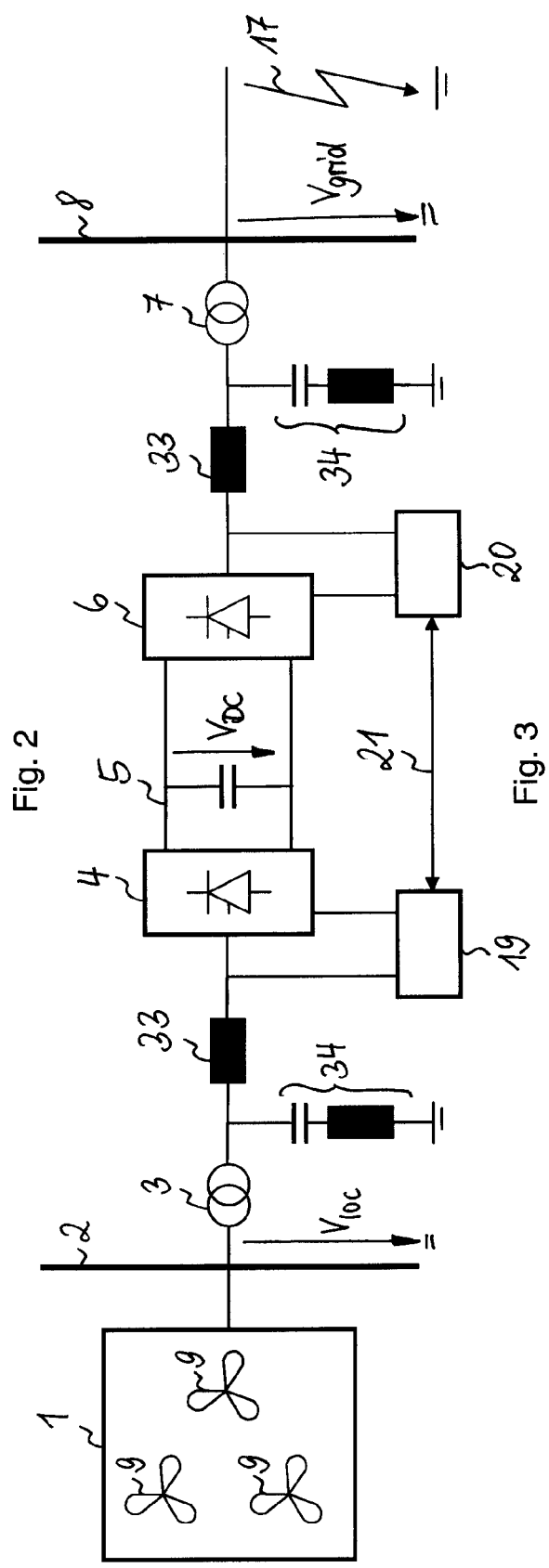
FIG. 3 shows the arrangement of FIG. 2 with two instead of one control units.

In FIG. 3, the one control 18 is replaced by a first control unit 19 controlling the first VSC 4 and a second control unit 20 controlling the second VSC 6. The two control units 19 and 20 communicate with each other via a transmission link 21 which can be wired or wireless.

Figure 4:
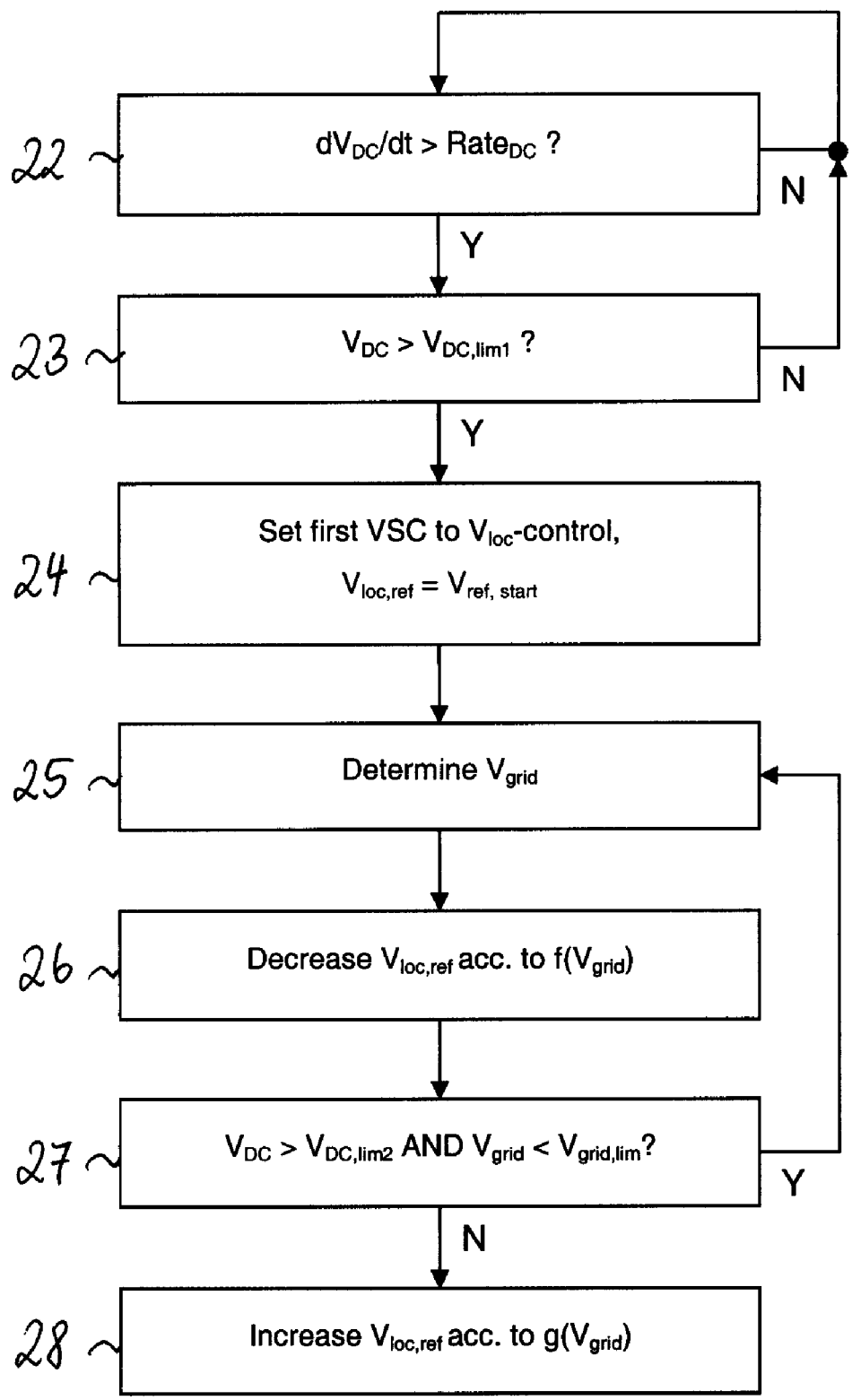
FIG. 4 shows a flow chart of a method applied to the arrangement of FIG. 2 or 3 to react to a fault in the AC grid.

A method performed either by the one control unit 18 or the first control unit 19 is shown in the flow chart of FIG. 4. In the first step 22, the positive rate of change $dV_{DC}/dt$ of the DC voltage $V_{DC}$, i.e. its rate of increase, is determined and compared with a predetermined rate level $Rate_{DC}$. If the rate of change does not exceed the predetermined rate level, step 22 is repeated. If the predetermined rate level is exceeded, the magnitude of the DC voltage $V_{DC}$ is compared in step 23 with a first predetermined DC voltage level $V_{DC,lim1}$. If the voltage level is not exceeded, the method returns to step 22. If the voltage level is exceeded, a fault is recognized. As a result, the first VSC 4 is no longer controlled according to the normal working conditions. Instead its control is set in step 24 to control of the AC voltage $V_{loc}$ of the local AC bus 2 and the reference value $V_{loc,ref}$ for the magnitude of the AC voltage in the local AC bus 2 is set to a start value $V_{ref,start}$. In the next step 25, the AC voltage magnitude $V_{grid}$ of the AC grid 8 is determined. In step 26, the reference value $V_{loc,ref}$ for the AC voltage magnitude of the local AC bus 2 is decreased in accordance with a decrease in the AC voltage magnitude $V_{grid}$ of the AC grid 8. This is done using a function f which depends on the AC voltage magnitude $V_{grid}$. As a result, the AC voltage magnitude of the local AC bus 2 will be reduced which leads to a reduction in the power generated by the ASGs 9 of wind farm 1. In the next step 27, the DC voltage $V_{DC}$ is compared with a second predetermined DC voltage level $V_{DC,lim2}$, which can be equal to the first predetermined voltage level $V_{DC,lim1}$ in order to check if the DC voltage is still at a higher level than normal. At the same time, the magnitude of the grid voltage $V_{grid}$ is compared with a predetermined grid voltage level $V_{grid,lim}$ in order to find out if the AC grid 8 is recovering or not. If the DC voltage $V_{DC}$ is still high and the magnitude of the grid voltage $V_{grid}$ is still low, the fault or at least its consequences are still present and need to be compensated, why the method returns to step 25. If the DC voltage $V_{DC}$ has fallen below the predetermined DC voltage level $V_{DC,lim}$ and if the magnitude of the AC grid voltage $V_{grid}$ has increased to exceed the second predetermined grid voltage level $V_{grid,lim2}$, the AC grid 8 is about to recover and the method increases the reference value $V_{loc,ref}$ for the AC voltage magnitude of the local AC bus 2 in accordance with an increase in the AC voltage magnitude $V_{grid}$ by applying a function g in step 28. This ensures a gradual increase in the power generated in the ASGs 9 of wind farm 1 thereby bringing the whole power infeed arrangement safely back to normal working conditions. Instead of checking both the level of the DC voltage $V_{DC}$ and of the grid voltage $V_{grid}$ in step 27, it can also be sufficient to the check the level of the grid voltage $V_{grid}$ alone.

The invention claimed is:

1. A method to influence a power generation of at least one adjustable speed generator, where the at least one adjustable speed generator provides power at constant frequency to a local AC bus, the local AC bus being connected via a first voltage source converter to a DC link which in turn is connected via a second voltage source converter to an AC grid, the method comprising:
   controlling via the first voltage source converter an AC voltage in the local AC bus; and
   modifying a reference value for a AC voltage magnitude of the local AC bus in dependence on a AC voltage magnitude of the AC grid.

2. The method according to claim 1, further comprising:
   detecting a fault in the AC grid,
   setting the control of the first voltage source converter to control the AC voltage in the local AC bus; and
   reducing the reference value for the AC voltage magnitude of the local AC bus with decreasing AC voltage magnitude of the AC grid.

3. The method according to claim 2, wherein after a clearance of the fault the reference value for the AC voltage magnitude of the local AC bus is increased with increasing AC voltage magnitude of the AC grid.

4. The method according to claim 2, wherein the fault in the AC grid is detected when a rate of an increase in the DC voltage exceeds a predetermined rate level.

5. The method according to claim 4, wherein the fault in the AC grid is detected when additionally the DC voltage exceeds a first predetermined voltage level.

6. The method according to claim 1, wherein the AC voltage magnitude of the AC grid is sent via telecommunication from a first control unit which controls the first voltage source converter to a second control unit which controls the second voltage source converter 7. A system to influence a power generation of at least one adjustable speed generator, the system comprising:
   a first voltage source converter connected to a local AC bus, where the local AC bus is provided with power at constant frequency by the at least one adjustable speed generator,
   a second voltage source converter connected to an AC grid,
   a DC link connected between the first and the second voltage source converter, and
   at least one control unit to control the first and the second voltage source converters,
   wherein the at least one control unit
   controls the AC voltage in the local AC bus via the first voltage source converter, and
   modifies a reference value for the AC voltage magnitude of the local AC bus in dependence on the AC voltage magnitude of the AC grid.

8. A system according to claim 7, further comprising:
   a first control unit to control the first voltage source converter, and
   a second control unit to control the second voltage source converter, wherein the second control unit sends the AC voltage magnitude of the AC grid via a telecommunication link to the first control unit.

* * * * *